(12) United States Patent  (10) Patent No.: US 7,900,241 B1
MacKenzie et al.  (45) Date of Patent: Mar. 1, 2011

(54) METHODS AND APPARATUS FOR POST-SEARCH AUTOMATED FULL-ARTICLE RETRIEVAL

(75) Inventors: Malcolm James MacKenzie, Belmont, MA (US); Uri Blank, Brighton, MA (US); Nick Polyak, Brighton, MA (US)

(73) Assignee: Quosa, Inc., Waltham, MA (US)

( * ) Notice: Subject to any disclaimer, the term of this patent is extended or adjusted under 35 U.S.C. 154(b) by 1193 days.

(21) Appl. No.: 11/496,735

(22) Filed: Jul. 31, 2006

(51) Int. Cl.
 *G06F 7/04* (2006.01)
(52) U.S. Cl. ......................................................... 726/4
(58) Field of Classification Search ........................ None
 See application file for complete search history.

(56) References Cited

U.S. PATENT DOCUMENTS 7,107,448 B1 *  9/2006  MacKay et al. ............. 713/171
2003/0065642 A1 *  4/2003  Zee ................................ 707/1

\* cited by examiner

*Primary Examiner* — Brandon S Hoffman
(74) *Attorney, Agent, or Firm* — Chapin IP Law, LLC; David W. Rouille, Esq.

(57) ABSTRACT

A system renders at least one content library in an organization region. The content library represents content that is accessible via a policy. The system receives a selection to obtain the content represented by the content library, and renders content information that represents a listing of the content contained within the content library. The content information is displayed within a listing region wherein the content may be accessible via the policy. The system downloads the content for which access has been granted via the policy. The content is downloaded from a content source provider.

19 Claims, 14 Drawing Sheets

```
205 RENDER AT LEAST ONE CONTENT LIBRARY IN AN ORGANIZATION REGION,
THE AT LEAST ONE CONTENT LIBRARY REPRESENTING CONTENT THAT IS
ACCESSIBLE VIA A POLICY

206 RECEIVE A SELECTION OF THE CONTENT SOURCE PROVIDER FROM
    WHICH TO CREATE THE AT LEAST ONE CONTENT LIBRARY
                        ↓
    207 RECEIVE AT LEAST ONE SEARCH CRITERION WITH WHICH TO FILTER
    CONTENT ON THE CONTENT SOURCE PROVIDER
                        ↓
    208 PERFORM A SEARCH ON THE CONTENT SOURCE PROVIDER USING THE
    AT LEAST ONE SEARCH CRITERION
                        ↓
    209 CREATE THE AT LEAST ONE CONTENT LIBRARY FROM A RESULT OF
    THE SEARCH ON THE CONTENT SOURCE PROVIDER
                        ↓
    210 STORE THE AT LEAST ONE CONTENT LIBRARY LOCALLY
```

*FIG. 8*

211 CREATE THE AT LEAST ONE CONTENT LIBRARY FROM A RESULT OF THE SEARCH ON THE CONTENT SOURCE PROVIDER

212 RECEIVE A SELECTION OF A FORMAT IN WHICH TO RETRIEVE THE CONTENT FROM THE CONTENT SOURCE PROVIDER

OR

213 RECEIVE AN INDICATION OF AN AMOUNT OF CONTENT TO RETRIEVE FROM THE CONTENT SOURCE PROVIDER

*FIG. 9*

220 RECEIVE A SELECTION TO OBTAIN THE CONTENT REPRESENTED BY THE AT LEAST ONE CONTENT LIBRARY

221 RECEIVE A SELECTION TO VIEW AN ANNOTATION ASSOCIATED WITH THE AT LEAST ONE CONTENT FOLDER ASSOCIATED WITH THE AT LEAST ONE CONTENT LIBRARY, THE ANNOTATION PROVIDING AN EXPLANATION ASSOCIATED WITH THE AT LEAST ONE CONTENT FOLDER

OR

222 RECEIVE A SELECTION TO EDIT THE ANNOTATION ASSOCIATED WITH THE AT LEAST ONE CONTENT FOLDER

*FIG. 11*

223 RENDER CONTENT INFORMATION THAT REPRESENTS A LISTING OF THE CONTENT CONTAINED WITHIN THE AT LEAST ONE CONTENT LIBRARY, THE CONTENT INFORMATION DISPLAYED WITHIN A LISTING REGION WHEREIN THE CONTENT MAY BE ACCESSIBLE VIA THE POLICY

224 OBTAIN A LOCATION ASSOCIATED WITH A FILE WITHIN THE AT LEAST ONE CONTENT FOLDER WITHIN THE AT LEAST ONE CONTENT LIBRARY

225 ASSOCIATE THE LOCATION OF THE FILE WITH THE CONTENT INFORMATION

226 DISPLAY THE CONTENT INFORMATION WITH A CONTENT IDENTIFIER IDENTIFYING A FORMAT ASSOCIATED WITH THE FILE

*FIG. 12*

226 DISPLAY THE CONTENT INFORMATION WITH A CONTENT IDENTIFIER IDENTIFYING A FORMAT ASSOCIATED WITH THE FILE

227 RECEIVE A NOTIFICATION TO UPDATE THE FILE ASSOCIATED WITH THE CONTENT INFORMATION WITHIN THE LISTING REGION, THE NOTIFICATION TO BE AUTOMATICALLY INVOKED AT A PREDETERMINED TIME

OR

228 RECEIVE A SELECTION TO PERFORM AN ACTION ON AN ANNOTATION ASSOCIATED WITH THE FILE, THE ANNOTATION PROVIDING AN EXPLANATION ASSOCIATED WITH THE FILE WITHIN THE LISTING REGION, THE ACTION INCLUDING AT LEAST ONE OF:
I)   VIEWING THE ANNOTATION;
II)  EDITING THE ANNOTATION; AND
III) DELETING THE ANNOTATION

OR

229 RECEIVE A REQUEST TO PERFORM A SEARCH ON THE CONTENT REPRESENTED BY THE CONTENT INFORMATION DISPLAYED WITHIN THE LISTING REGION

OR

230 RECEIVE A SELECTION OF THE CONTENT INFORMATION IN THE LISTING REGION

231 DISPLAY THE FILE ASSOCIATED WITH THE CONTENT INFORMATION

*FIG. 13*

METHODS AND APPARATUS FOR POST-SEARCH AUTOMATED FULL-ARTICLE RETRIEVAL

BACKGROUND

Research databases provide a wealth of technical and scientific information for researchers (i.e., commercial, academic, etc.). Research databases provide online libraries of documents related to medicine, government, etc., complete with searchable citations, bibliographies, etc., associated with those documents. Users can search the research databases by entering search criteria. From the results produced by a search, the user can download those documents of interest.

Some research databases are accessible to any user, while other research databases require a subscription to access. The terms of the subscriptions vary and set by content providers. Subscriptions are purchased (either on individual level or as a package covering multiple users) by users. Generally, for any type of subscription (i.e., individual or group), each user can download copyrighted materials to own computer, and keep them there for a period of time. But after copyrighted material is downloaded, multiple users cannot use the copyrighted material even if those users are a part of the same subscription group. The copyrighted materials cannot be allocated to an infrastructure where users can access the copyrighted materials, instead of going to the original source of copyrighted materials.

SUMMARY

Conventional technologies for managing and sharing search results suffer from a variety of deficiencies. In particular, conventional technologies for managing and sharing search results are limited in that creating and sharing a content library obtained from subscription based research databases violates copyright laws. For example, a first user who has access to a research database via a paid subscription, performs a search, and downloads a collection of documents (i.e., a content library) from a research database, or content source provider. The first user then uploads the collection of documents to a server accessible by other users. First user by loading and other users by accessing that collection of documents on the server are violating copyright law even if all these users possess a paid subscription. Every user that possesses a paid subscription must obtain their own copy of the content, via the content source providers. Likewise, users cannot place content to their own server for access by other users unless the content is purchased for this purpose via, for example, a Copyright Clearance Center.

Yet, the searches performed by the first user produced a very valuable set of relevant documents. Requiring other users to perform the same searches in order to download the full text of the content is an unnecessary duplication of efforts, and may not result in the optimum collection of research documents. For example, a first user may compile a collection of documents including adding notes, or annotations, to the collection indicating which documents within the collection may be most relevant to other users. If other users have to repeat the same searches, those annotations will not be propagated along with the results of the new searches. A solution to that would be to create a database of links to the copyrighted materials along with notes or annotations. But in this case users will not be able to use sophisticated query interface offered by the content provider web sites. Thus, users of research databases are faced with either violating copyright laws, repeating searches to produce a collection of documents, or libraries that suit the user's needs, or have a solution which is not fully address their needs.

Embodiments disclosed herein significantly overcome deficiencies of conventional technologies and provide a system that includes a computer system executing an article retrieving process and full text search. The resulting system is perceived by the end users as a full text database of copyrighted material but in fact does not contain any copyrighted data but only methods of search and retrieval.

The article retrieving process allows a user to choose a research database, or content source provider, and perform a search. Once the search is performed, the results are displayed in the form of abstracts (i.e., abbreviated version of the documents) in a view region within an article retrieving process graphical user interface. In other words, the user makes a search on the on-line database (i.e., content source provider) using search interface of that online database. After user satisfied with the results of the search, he then retrieves the documents in the desired format, usually PDF or HTML. The user then can search within the results to further refine the document set.

For example, the user may search on documents related to high cholesterol, and then further search in those results. For example, a user can perform a Boolean search of "LDL" and "greater than 190" to find those documents that are related to Low-density lipoprotein (LDL) over 190. After performing the search, the user can specify how many documents to retrieve (i.e., download from the research database), and in which format to return the results (i.e., PDF documents, HTML documents, etc.). The results of the retrieval are displayed in a listing region within the article retrieving process graphical user interface. The listing region lists each of the documents as a result of the search, along with an icon indicating the format of the document (i.e., PDF, etc), the author(s) of the documents and the title. Each listing of a document itemized within the listing region is a reference to that document. By selecting the reference to the document, a user can choose to view the already retrieved document, but only if the user has access (i.e., a paid subscription) to that document. If the user does not have access to the research database, and only an abstract of the document is displayed.

The user can save the listing of the retrieved documents to a content library such that other users can benefit from the results of the search. The user can add annotations to the documents, and save the annotations along with the content library. The user can upload the content library to a server where other users can access the content library. Other users can access the content library, including the listing of the results within the listing region, and search the annotations associated with that content library, or search full text. However, other users selecting the reference to the document (from within the listing region) will only be able to retrieve/download the document from the research database if those other users have access to the documents within the research database. In other words, the content library created by the initial user contains references to the actual documents and any annotations that the user added to the content library, but does not contain the actual documents. When other users access the content library, those users have access to the references to the actual documents, but not the actual documents. The document is only downloaded/retrieved from the research database when a user, having access to that research database, retrieves that document. To avoid limitations in the search and analysis of the documents in the Virtual library a full text index of the content library documents is created on the user computer and is sent to the server to allow other users to perform a full text search on the content.

When user retrieves documents he found on the server, those documents can be stored locally (by a user having access to the research database), on this user's computer. The article retrieving process lists all the user's content libraries in an organization region in the article retrieving process graphical user interface. The organization region presents the user's searches and the user's content libraries. The content libraries each have an icon indicating whether that content library is stored locally, or whether the content library has been uploaded to a server accessible by other users. If a content library has been uploaded to a server, and the content library has been updated since the last time the user downloaded that content library locally, for example, to the user's computer, an icon on the content library will indicate to the user that the user no longer has the most updated version of that content library.

The article retrieving process from the server renders at least one content library in an organization region in a graphical user interface. The content library represents content (i.e., documents from a research database or content source provider) that is accessible via a policy (for example, a paid subscription). The article retrieving process receives a selection to obtain the content represented by the content library and a method to access each document, and renders content information that represents a listing of the content contained within the content library. The content information is displayed within a listing region wherein the content may be accessible via the policy. That is, the listing region contains content information, or references to the content (i.e., documents from a research database or content source provider). Depending on whether the user trying to access the content information has access, the content information may represent content that is accessible to the user. That is, any user can view the content information within the listing region, but only users who have access to that content via the content source provider can access the content represented by the content listing. The article retrieving process downloads the content (from a content source provider) for which access has been granted via the policy.

During an example operation of one embodiment, suppose a user, using the article retrieving process via a graphical user interface, wants to perform research that may be of value to other colleagues. The user selects a content source provider, such as a medical research database, and performs a search. The medical research database returns the results in the form of abbreviated versions (i.e., abstracts) of the content (i.e., medical articles available on the medical research database) in the view region of the graphical user interface. The user reviews the abstracts, and selects ten of the abstracts by selecting a check box next to each abstract within the view region of the graphical user interface, then selects 'Retrieve" from the view region toolbar. In the listing region, content information associated with the selected ten abstracts is displayed. The content information includes the author of each of the abstracts as well as the title associated with each of the content. An icon next to each of the abstracts listed indicates the format (i.e., PDF, HTML, etc.) of the content (i.e., document, article, etc.) associated with each abstract. The content information is a reference to the actual content (i.e., documents, articles, etc.) and data structures needed to build full text search capability on the server. The user adds an annotation to several of the documents, and then edits some of the annotations to include more information for the user's colleagues. The content library is stored on the user's computer, and is displayed within an organization region within the article retrieving process graphical user interface. The content library is displayed with an icon indicating the content library is available locally only to the user. The user selects the content library from the organization view and uploads the content library (but not the actual documents) to a server so that the user's colleagues can also view and search in the content library. The content library in the user's organization view is now displayed with an icon indicating the content library has been uploaded to a server, and is available to other users. The user's colleagues can access the content library, including viewing the annotations provided by the user. The user's colleagues can search and download the content from the content source provider. If any of the user's colleagues modify the content library, the icon on the user's organization view will indicate the content library has been modified since the last time the user downloaded the content library from the server, or in this case, since the content library was uploaded from the user's computer to a server. Search method of the library maintained automatically to allow search of its content.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Quosa of Brighton, Mass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 8 illustrates a flowchart of a procedure performed by the system of FIG. 1 when the article retrieving process renders at least one content library in an organization region, and receives a selection of the content source provider from which to create the at least one content library, according to one embodiment disclosed herein.

FIG. 9 illustrates a flowchart of a procedure performed by the system of FIG. 1 when the article retrieving process receives at least one search criterion with which to filter content on the content source provider, according to one embodiment disclosed herein.

FIG. 11 illustrates a flowchart of a procedure performed by the system of FIG. 1 when the article retrieving process receives a selection to obtain the content represented by the at least one content library, according to one embodiment disclosed herein.

FIG. 12 illustrates a flowchart of a procedure performed by the system of FIG. 1 when the article retrieving process renders content information that represents a listing of the content contained within the at least one content library, the content information displayed within a listing region wherein the content may be accessible via the policy, according to one embodiment disclosed herein.

FIG. 13 illustrates a flowchart of a procedure performed by the system of FIG. 1 when the article retrieving process displays the content information with a content identifier identifying a format associated with the file, according to one embodiment disclosed herein.

DETAILED DESCRIPTION

Figure 1:
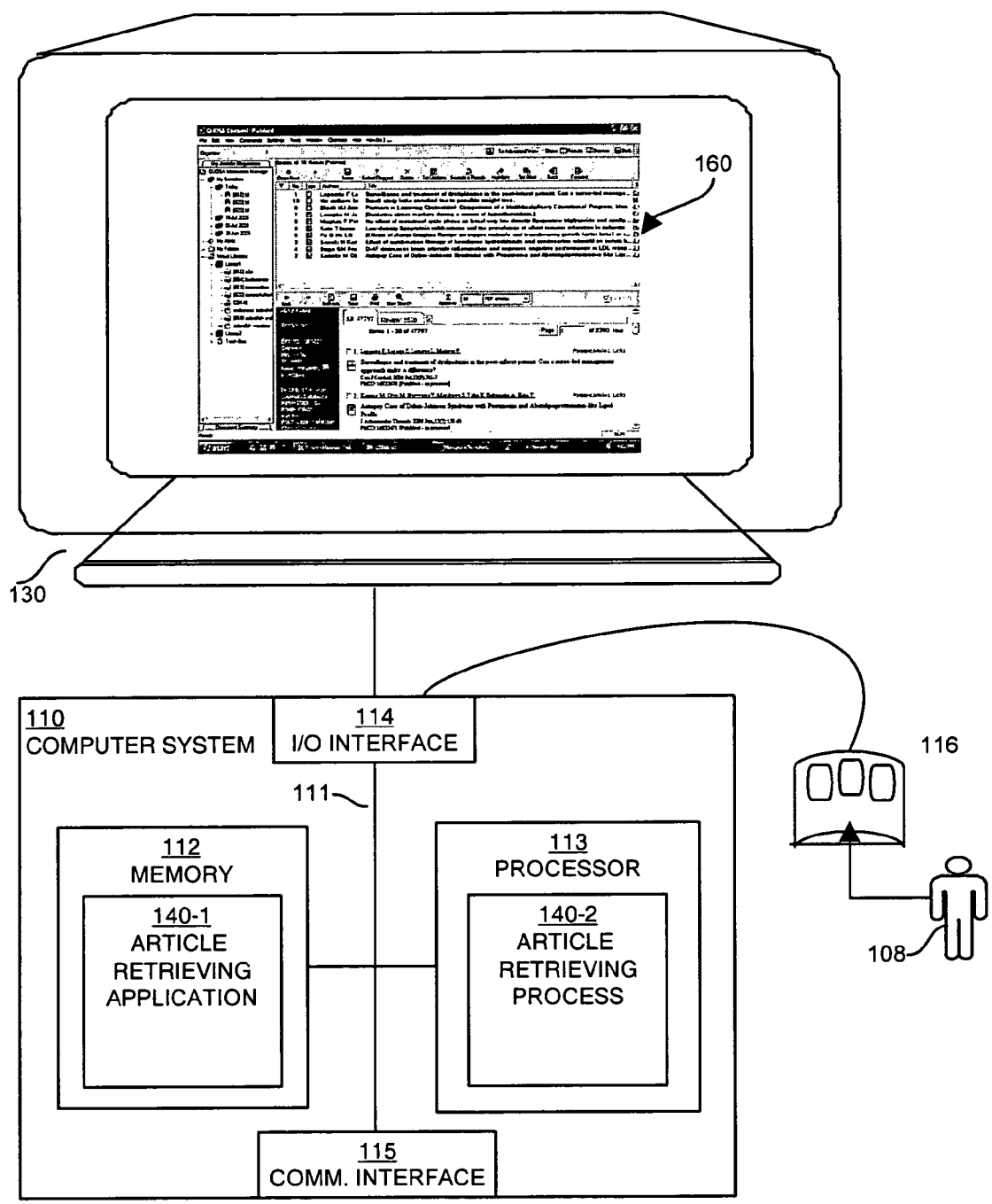
FIG. 1 shows a high-level block diagram of a computer system according to one embodiment disclosed herein.

Embodiments disclosed herein include methods and a computer system that perform an article retrieving process and full text search. The resulting system is perceived by the end users as a full text database of copyrighted material but in fact does not contain any copyrighted data but only methods of search and retrieval.

The article retrieving process allows a user to choose a research database, or content source provider, and perform a search. Once the search is performed, the results are displayed in the form of abstracts (i.e., abbreviated version of the documents) in a view region within an article retrieving process graphical user interface. In other words, the user makes a search on the on-line database (i.e., content source provider) using search interface of that online database. After user satisfied with the results of the search, he then retrieves the documents in the desired format, usually PDF or HTML. The user then can search within the results to further refine the document set.

For example, the user may search on documents related to high cholesterol, and then further search in those results. The results of the retrieval are displayed in a listing region within the article retrieving process graphical user interface. The listing region lists each of the documents as a result of the search, along with an icon indicating the format of the document (i.e., PDF, etc), the author(s) of the documents and the title. Each listing of a document itemized within the listing region is a reference to that document. By selecting the reference to the document, a user can choose to view the already retrieved document, but only if the user has access (i.e., a paid subscription) to that document. If the user does not have access to the research database, and only an abstract of the document is displayed.

The user can save the listing of the retrieved documents to a content library such that other users can benefit from the results of the search. The user can add annotations to the documents, and save the annotations along with the content library. The user can upload the content library to a server where other users can access the content library. Other users can access the content library, including the listing of the results within the listing region, and search the annotations associated with that content library, or search full text. However, other users selecting the reference to the document (from within the listing region) will only be able to retrieve/download the document from the research database if those other users have access to the documents within the research database. In other words, the content library created by the initial user contains references to the actual documents and any annotations that the user added to the content library, but does not contain the actual documents. When other users access the content library, those users have access to the references to the actual documents, but not the actual documents. The document is only downloaded/retrieved from the research database when a user, having access to that research database, retrieves that document. To avoid limitations in the search and analysis of the documents in the Virtual library a full text index of the content library documents is created on the user computer and is sent to the server to allow other users to perform a full text search on the content.

When user retrieves documents he found on the server, those documents can be stored locally (by a user having access to the research database), on this user's computer. The article retrieving process lists all the user's content libraries in an organization region in the article retrieving process graphical user interface. The organization region presents the user's searches and the user's content libraries. The content libraries each have an icon indicating whether that content library is stored locally, or whether the content library has been uploaded to a server accessible by other users. If a content library has been uploaded to a server, and the content library has been updated since the last time the user downloaded that content library locally, for example, to the user's computer, an icon on the content library will indicate to the user that the user no longer has the most updated version of that content library.

The article retrieving process from the server renders at least one content library in an organization region in a graphical user interface. The content library represents content (i.e., documents from a research database or content source provider) that is accessible via a policy (for example, a paid subscription). The article retrieving process receives a selection to obtain the content represented by the content library and a method to access each document, and renders content information that represents a listing of the content contained within the content library. The content information is displayed within a listing region wherein the content may be accessible via the policy. That is, the listing region contains content information, or references to the content (i.e., documents from a research database or content source provider). Depending on whether the user trying to access the content information has access, the content information may represent content that is accessible to the user. That is, any user can view the content information within the listing region, but only users who have access to that content via the content source provider can access the content represented by the content listing. The article retrieving process downloads the content (from a content source provider) for which access has been granted via the policy.

FIG. 1 is a block diagram illustrating example architecture of a computer system 110 that executes, runs, interprets, operates or otherwise performs an article retrieving application 140-1 and process 140-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114, and enables a user 108 to provide input commands and generally control the graphical user interface 160 that the article retrieving application 140-1 and process 140-2 provides on the display 130. The communications interface 115 enables the computer system 110 to communicate with other devices (i.e., other computers) on a network (not shown). This can allow access to the article retrieving application by remote computer systems and, in some embodiments, the contents of the container can be obtained from a remote source via the communications interface 115.

The memory system 112 is any type of computer readable medium and, in this example, is encoded with an article retrieving application 140-1. The article retrieving application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112, via the interconnect 111, in order to launch, run, execute, interpret or otherwise perform the logic instructions of the article retrieving application 140-1. Execution of article retrieving application 140-1 in this manner produces processing functionality in an article retrieving process 140-2. In other words, the article retrieving process 140-2 represents one or more portions of runtime instances of the article retrieving application 140-1 (or the entire application 140-1) performing or executing within or upon the processor 113 in the computerized device 110 at runtime.

It is noted that example configurations disclosed herein include the article retrieving application 140-1. The article retrieving application 140-1 may be stored on a computer readable medium (such as a floppy disk), hard disk, electronic, magnetic, and optical or other computer readable medium. The article retrieving application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the article retrieving application 140-1 in the processor 113 as the article retrieving process 140-2. Those skilled in the art will understand that the computer system 110 may include other processes and/or software and hardware components, such as an operating system not shown in this example.

A display 130 need not be coupled directly to computer system 110. For example, the article retrieving application 140-1 can be executed on a remotely accessible computerized device via the network interface 115. In this instance, the graphical user interface 160 may be displayed locally to a user of the remote computer and execution of the processing herein may be client-server based.

Further details of configurations explained herein will now be provided with respect to a flow chart of processing steps that show the high level operations disclosed herein to perform the article retrieving process 140-2.

Figure 2:
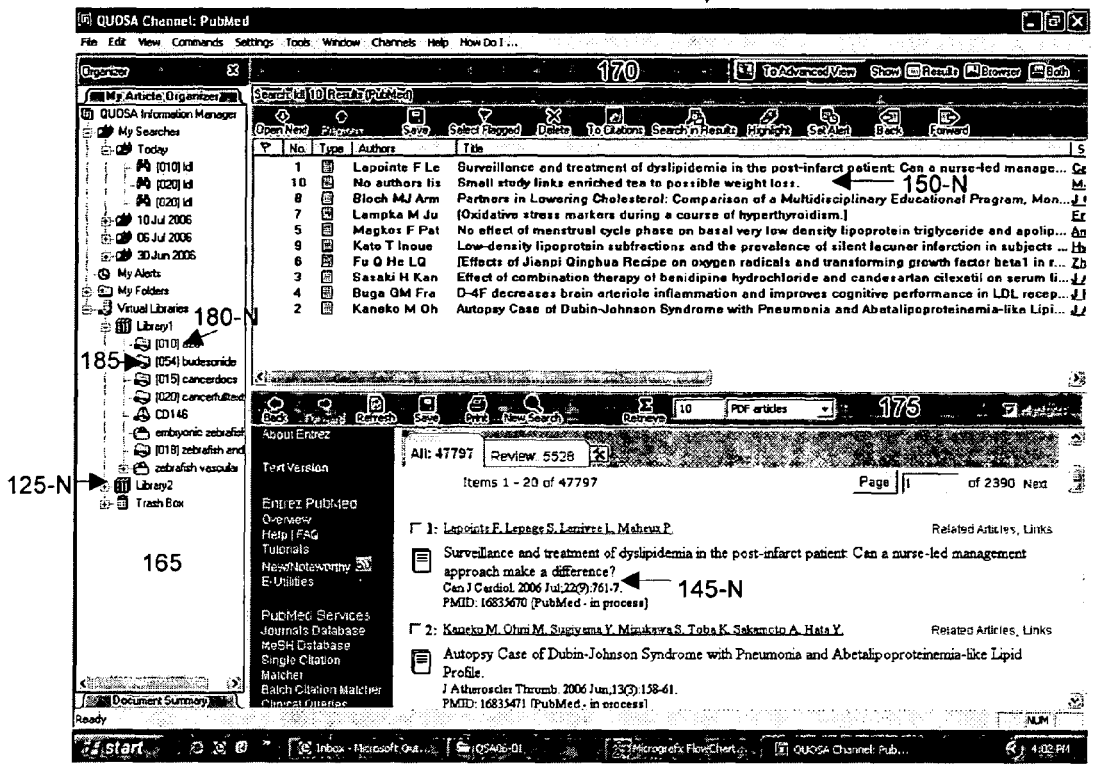
FIG. 2 is an example screenshot of the article retrieve process displaying the results of a search, according to one embodiment disclosed herein.

FIG. 2 is an example screen shot of the article retrieving process 140-2 graphical user interface 160. The graphical user interface 160 contains a listing region 170, organization region 165 and the view region 175. The listing region 170 contains content information 150-N containing references to the results of a search performed within the view region 175. The view region 175 contains content 145-N (i.e., the results of the search). The organization region 165 contains content libraries 125-N containing folders 180-N, each folder 180-1 identified by an identifier 185.

Figure 3:
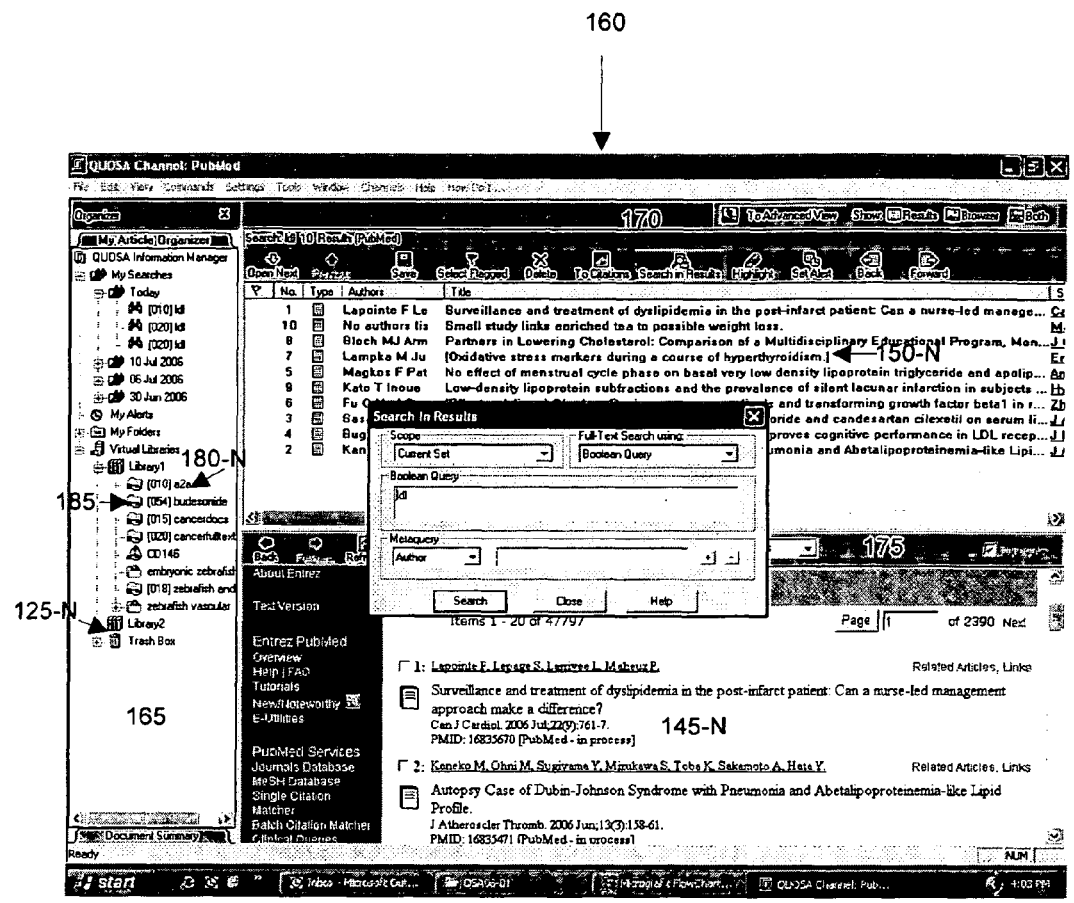
FIG. 3 is an example screenshot of the article retrieve process displaying a search of the results listed in the listing region, according to one embodiment disclosed herein.

FIG. 3 is an example screen shot of the article retrieving process 140-2 graphical user interface 160. The graphical user interface 160 contains a listing region 170, organization region 165 and the view region 175. The listing region 170 contains content information 150-N containing references to the results of a search performed within the view region 175. The view region 175 contains content 145-N (i.e., the results of the search). The organization region 165 contains content libraries 125-N containing folders 180-N, each folder 180-1 identified by an identifier 185. This example screenshot displays how a user 108 can perform a search on the results listed within the listing region 170. Note also that that user 108 can specify which of the content 145-N from the view region is listed as content information 150-N within the listing region by, for example, checking off the check box next to each content 145-1 displayed within the view region 175.

Figure 4:
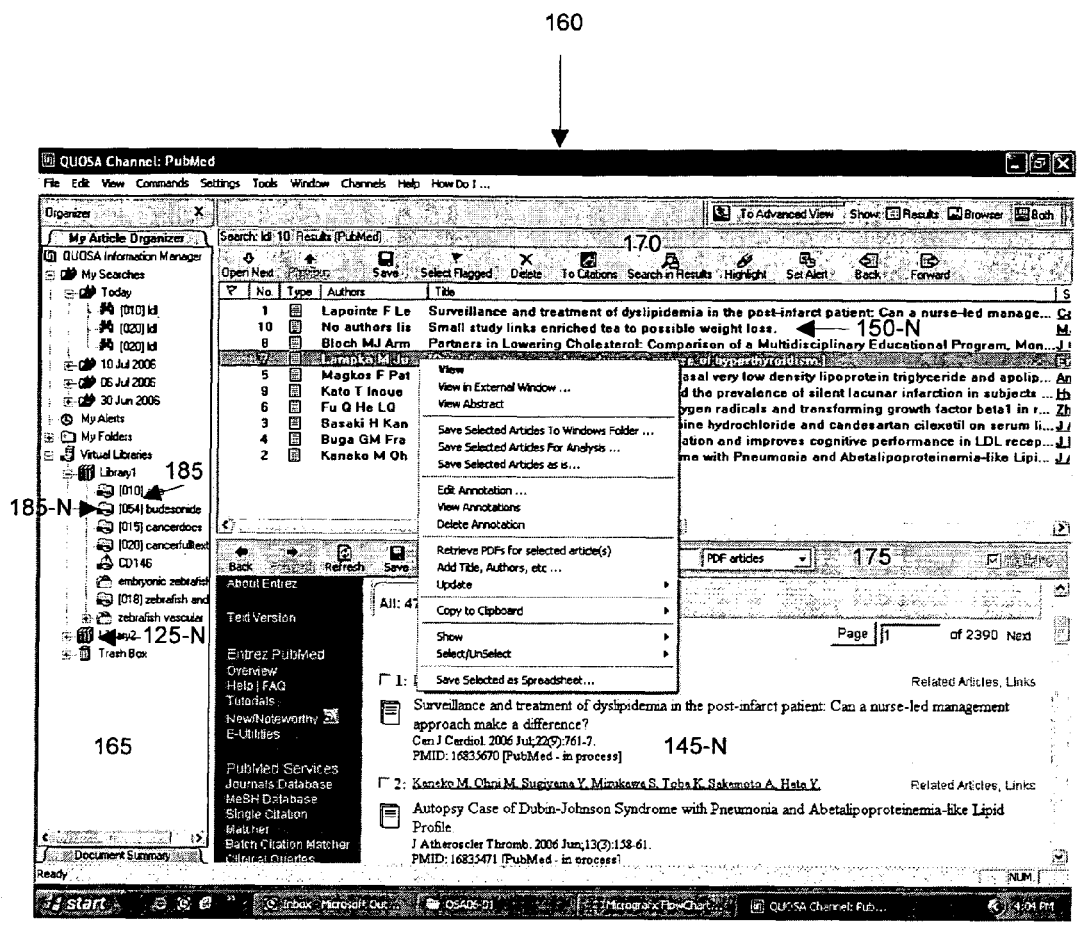
FIG. 4 is an example screenshot of the article retrieve process displaying options available within the listing region, according to one embodiment disclosed herein.

FIG. 4 is an example screen shot of the article retrieving process 140-2 graphical user interface 160. The graphical user interface 160 contains a listing region 170, organization region 165 and the view region 175. The listing region 170 contains content information 150-N containing references to the results of a search performed within the view region 175. The view region 175 contains content 145-N (i.e., the results of the search). The organization region 165 contains content libraries 125-N containing folders 180-N, each folder 180-1 identified by an identifier 185. This example screenshot displays how a user 108 can perform actions on content information 150-N displayed within the listing region 170, such as edit, view or delete an annotation.

Figure 5:
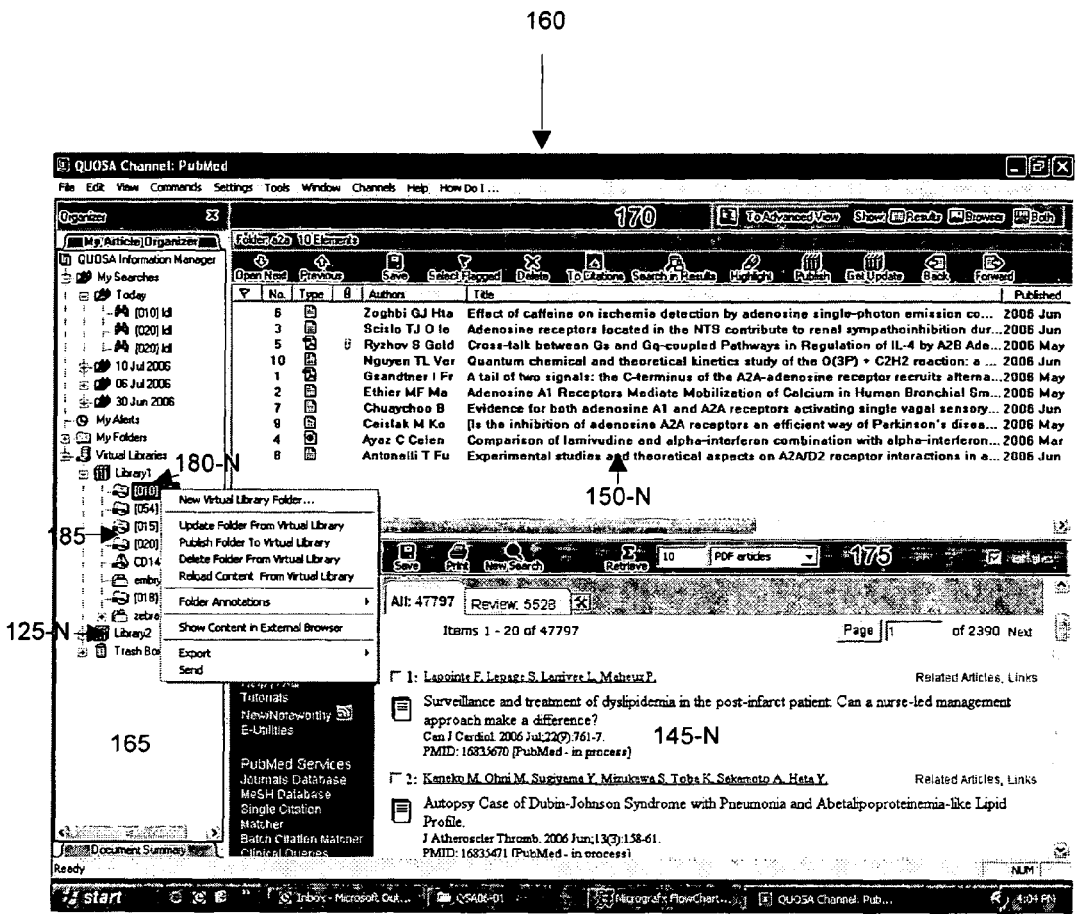
FIG. 5 is an example screenshot of the article retrieve process displaying options available to a content library displayed within the organization region, according to one embodiment disclosed herein.

FIG. 5 is an example screen shot of the article retrieving process 140-2 graphical user interface 160. The graphical user interface 160 contains a listing region 170, organization region 165 and the view region 175. The listing region 170 contains content information 150-N containing references to the results of a search performed within the view region 175. The view region 175 contains content 145-N (i.e., the results of the search). The organization region 165 contains content libraries 125-N containing folders 180-N, each folder 180-1 identified by an identifier 185. This example screenshot displays how a user 108 can perform an action on a folder 180-N, such as update, publish (to a remote server), delete, or reload a folder 180-N within the organization region 165.

Figure 6:
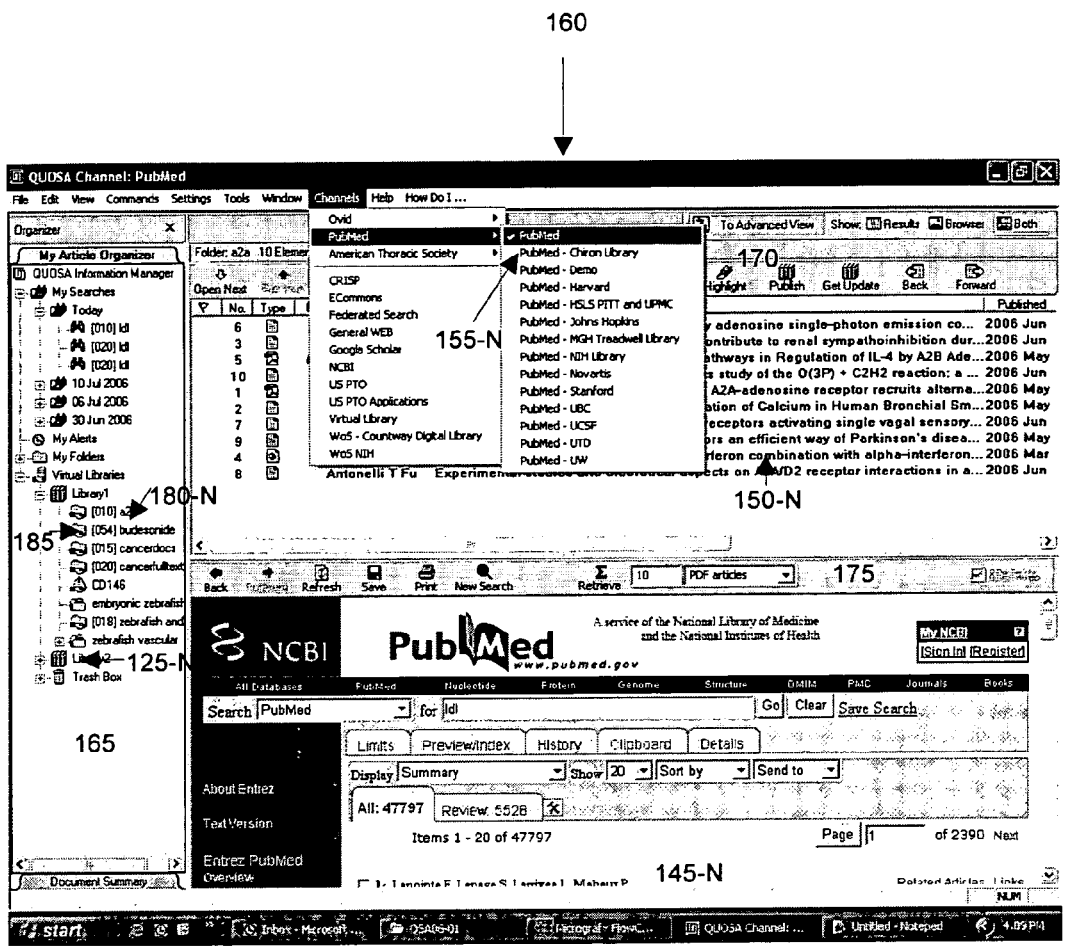
FIG. 6 is an example screenshot of the article retrieve process displaying a plurality of content source providers available, according to one embodiment disclosed herein.

FIG. 6 is an example screen shot of the article retrieving process 140-2 graphical user interface 160 displaying the content source providers 155-N available to a user 108. The user 108 can select a content source provider 155-1 from which to create content libraries 125-N. The graphical user interface 160 contains a listing region 170, organization region 165 and the view region 175. The listing region 170 contains content information 150-N containing references to the results of a search performed within the view region 175. The view region 175 contains content 145-N (i.e., the results of the search). The organization region 165 contains content libraries 125-N containing folders 180-N, each folder 180-1 identified by an identifier 185. This example screenshot displays how a user 108 can select which content source provider 155-1 from which to obtain content 145-N.

Figure 7:
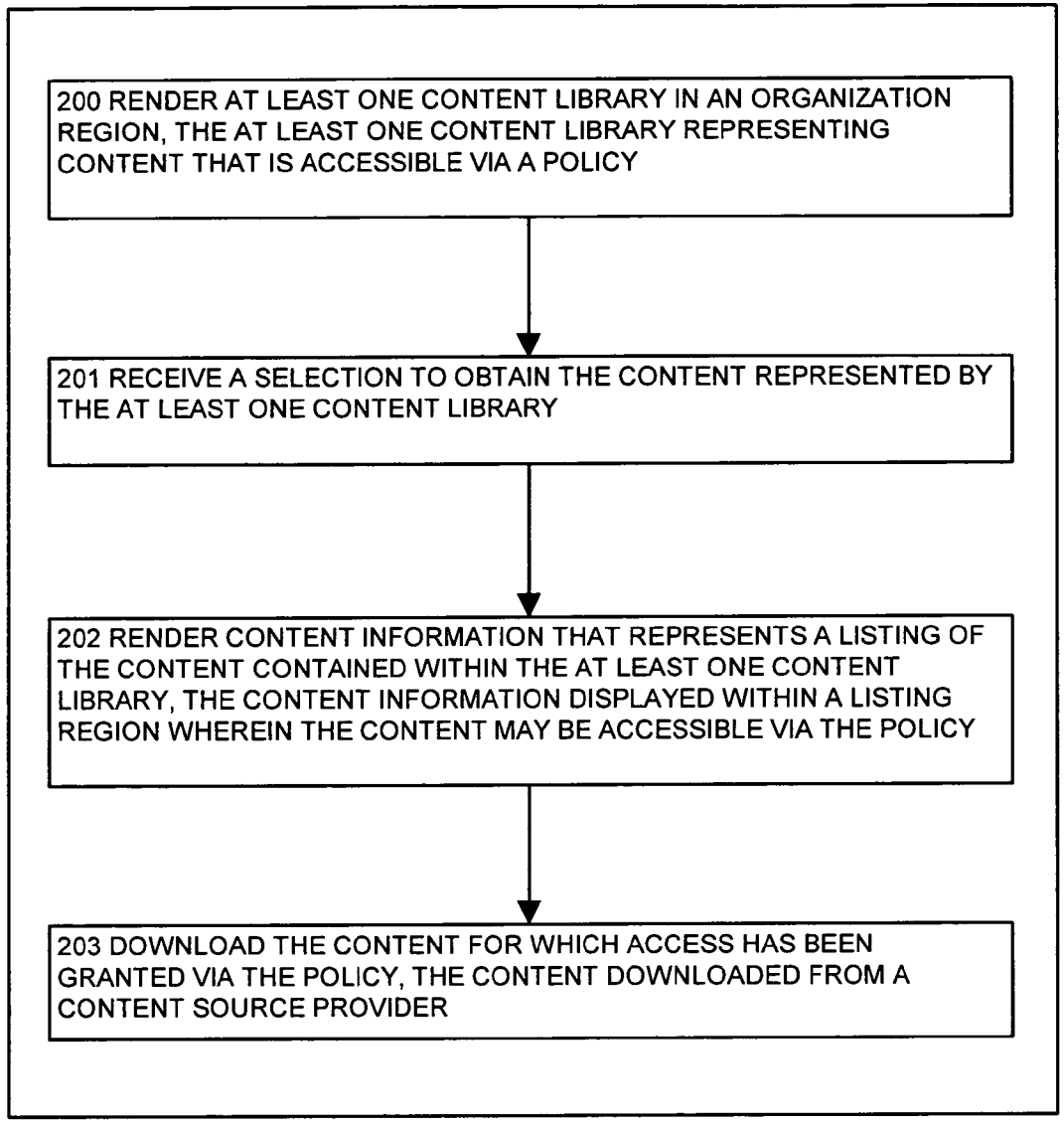
FIG. 7 illustrates a flowchart of a procedure performed by the system of FIG. 1 when the article retrieving process renders at least one content library in an organization region, the at least one content library representing content that is accessible via a policy, according to one embodiment disclosed herein.

FIG. 7 is a flowchart of the steps performed by the article retrieving process 140-2 when it renders at least one content library 125-1 in an organization region 165.

In step 200, the article retrieving process 140-2 renders at least one content library 125-1 in an organization region 165. The content library 125-1 represents content 145-N that is accessible via a policy (i.e., the content is accessible on the content source provider 155-1 via a policy, such as a paid subscription to the content source provider 155-1). The organization region 165 displays searches performed by the user 108, and categorizes those searches by the date on which the searches were performed. A user 108 can save a search, for example, to a folder 180-1 by selecting (from within the graphical user interface 160) the search with an input device 116, such as a mouse, and 'dragging' the search to the folder 180-1, then releasing the mouse 116. The user 108 can also create a new folder 180-1, name the new folder 180-1, and then copy the search to the new folder 180-1. The user 108 can also publish the folder 180-1 to a virtual server (i.e., a remote server) for other users 108 to access. The user can update the folder 180-1 from the virtual library, reload the content 145-N from the virtual library, or even delete the folder 180-1 from the virtual library. The organization region 165 displays content libraries 125-N that can be comprised of folders 180-1

In step 201, the article retrieving process 140-2 receives a selection to obtain the content 145-N represented by the content library 125-1. The organization region 165 displays content libraries 125-N arranged in a hierarchical order such that the content libraries 125-N contain folders 180-N, and the folders 180-N contain searches performed on content source providers 155-N. A user 108 can select a folder 180-N with, for example, a mouse 116 to obtain the content 145-N represented by the content library 125-1.

In step 202, the article retrieving process 140-2 renders content information 150-N that represents a listing of the content 145-N contained within the content library 125-1. The content information 150-N (i.e., a listing of references to the content 145) is displayed within a listing region 170. The content 145-N may be accessible via the policy. In other words, the listing of the content information 150-N represents references to the actual content 145-N. The actual content 145-N may or may not be accessible to a user 108 depending on whether that user 108 has access to the content 145-N. The listing of the content information 150-N does not indicate access to the content source provider 155-1.

In step 203, the article retrieving process 140-2 downloads the content 145-N for which access has been granted via the policy. The content 145-N is obtained from a content source provider 155-1. The user 108 can specify to obtain all the content 145-N within the content information 150-N listed in the listing region 175. The user 108 can also select the content 145-N from the content information 150-N by selecting individual listings in the listing region 170. Once the content 145-N is obtained (i.e., downloaded) from the content source provider 155-1, the user 108 can view and or save the content 145-N.

FIG. 8 is a flowchart of the steps performed by the article retrieving process 140-2 when it renders at least one content library 125-N (that represents content 145-N that is accessible via a policy) in an organization region 165.

In step 205, the article retrieving process 140-2 renders at least one content library 125-N (that represents content 145-N that is accessible via a policy) in an organization region 165. The content library 125-N can contain multiple folders 180-N representing searches performed by a user 108 on content source providers 155-N.

In step 206, the article retrieving process 140-2 receives a selection of the content source provider 155-1 from which to create the content library 125-1. A user 108, via the graphical user interface 160, selects a content source provider 155-1. FIG. 6 displays an example screen shot of the graphical user interface 160 with the content source provider 155-N selections displayed. The selection of the content source provider 155-1 produces the view region 175 with the content source provider 155-1 search web page. Via the graphical user interface 160 toolbar, the user 108 can select to view only the view region 175, or the view region and the listing region 170 simultaneously. The organization region 165 is also displayed to the user 108

In step 207, the article retrieving process 140-2 receives at least one search criterion with which to filter content 145-N on the content source provider 155-1. A user 108 enters a search criterion into the content source provider 155-1 search web page.

In step 208, the article retrieving process 140-2 performs a search on the content source provider 155-1 using the search criterion provided by the user 108. The results of the search are displayed within the view region 170.

In step 209, the article retrieving process 140-2 creates the content library 125-N from a result of the search on the content source provider 155-1. Via a toolbar on the view region, 170, the user 108 selects the amount of content 145-N (i.e., a number of articles, documents, etc.) to return as a result of the search. The results of that selection are displayed as content information 150-N within the listing region 170.

In step 210, the article retrieving process 140-2 stores the content library 125-1 locally. Within the organization region 165, the article retrieving process 140-2 displays that result under a folder 180-1 titled 'Searches". The user 108 can now move the new search to a content library 125-1 by selecting the search with a mouse 116, and 'dragging' the search to the content library 125-1. The user 108 can provide a name for the search and can store that search locally, for example, on the user's 108 computer.

FIG. 9 is a flowchart of the steps performed by the article retrieving process 140-2 when it creates the content library 125-N from a result of the search on the content source provider 155-1.

In step 211, the article retrieving process 140-2 creates the content library 125-N from a result of the search on the content source provider 155-1. After the search has been performed on the content source provider 155-1, the user 108 can specify how the content library 125-N is to be created.

In step 212, the article retrieving process 140-2 receives a selection of a format in which to retrieve the content 145-N from the content source provider 155-1. Within the view region 175, a user 108 can specify a format for the content 145-1 when creating the content library 125-1. For example, the user 108 can specify that the article retrieving process 140-2 retrieve content 145-N from the content source provider 155-1 in PDF format, or HTML format. The user 108 specifies the format, for example, via a drop down menu on the toolbar on the view region 170.

In step 213, the article retrieving process 140-2 receives an indication of an amount of content 145-N to retrieve from the content source provider 155-1. Within the view region 175, a user 108 can specify an amount of content 145-1 (i.e., a number of articles, documents, etc.) when creating the content library 125-1. For example, the user 108 specifies the number of articles to retrieve, for example, via an input field on the toolbar on the view region 170.

Figure 10:
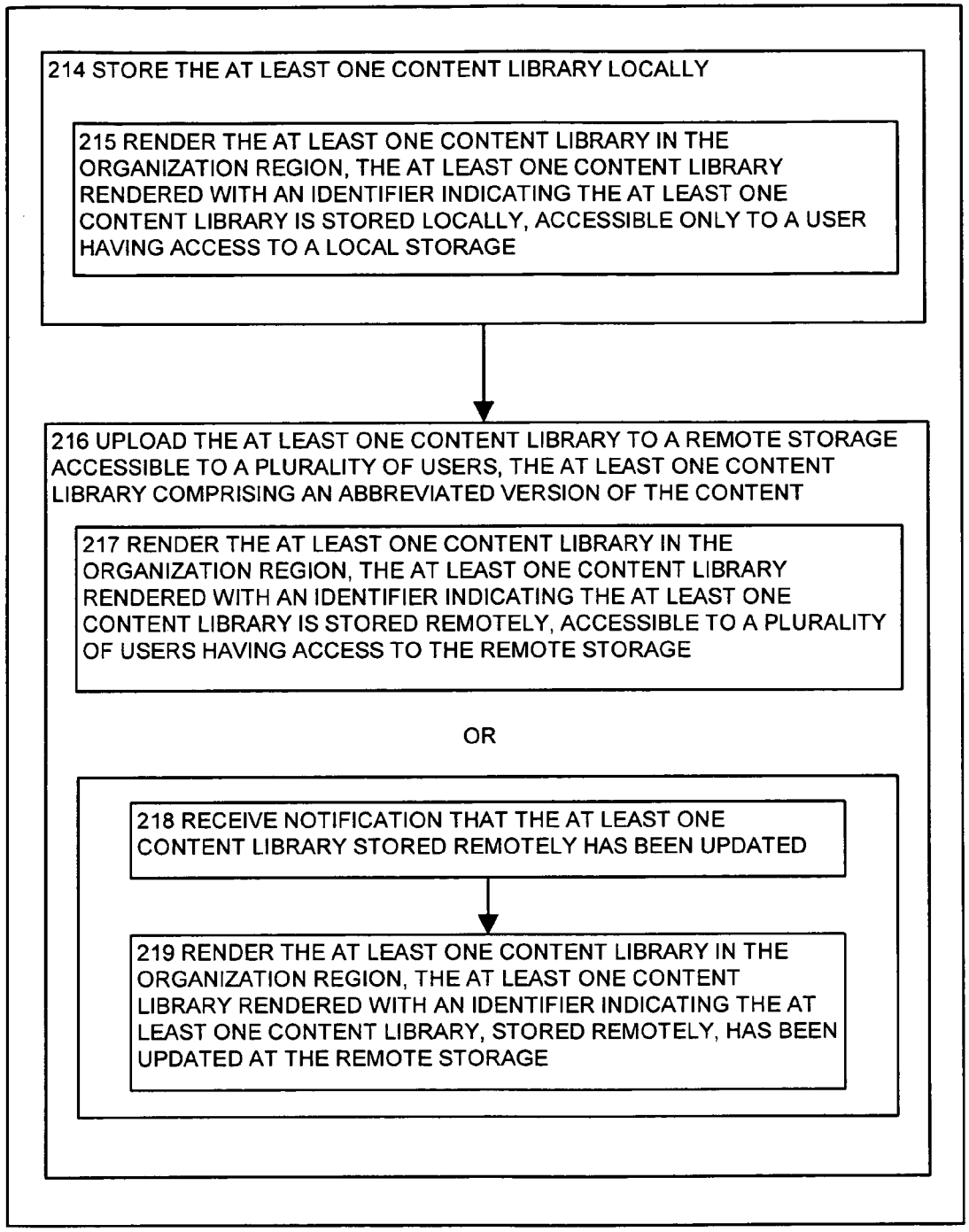
FIG. 10 illustrates a flowchart of a procedure performed by the system of FIG. 1 when the article retrieving process stores the at least one content library locally, according to one embodiment disclosed herein.

FIG. 10 is a flowchart of the steps performed by the article retrieving process 140-2 when it stores the content library 125-1 locally.

In step 214, the article retrieving process 140-2 stores the content library 125-1 locally, for example, on the user's 108 computer. The organization region 165 within the graphical user interface 160 provides a hierarchical display of a user's 108 searches and content libraries 125-N. In an example embodiment, the searches are displayed with an icon, such as a pair of binoculars, that indicate the search has not yet be saved to a content library 125-N.

In step 215, the article retrieving process 140-2 renders the content library 125-1 in the organization region 165. The content library 125-1 is rendered with an identifier indicating the content library 125-1 is stored locally (i.e., accessible only to a user 108 having access to a local storage). For example, a user 108 creates a content library 125-1 that is stored locally, for example, on the user's 108 computer. The locally stored content library 125-1 is displayed within the organization region 165, with an icon, indicating the content library 125-1 is only available to that user 108.

In step 216, the article retrieving process 140-2 uploads the content library 125-1 to a remote storage, accessible to a plurality of users 108. The content library 125-1 comprises an abbreviated version of the content 145-N. FIG. 5 displays an example screen shot of the options presented to the user 108 within the organization region 165. The user 108 can upload a locally stored content library 125-1 to a remote storage (i.e., a remote server) such that other users 108 can also access that content library 125-1. In this scenario, the user 108 who created the content library 125-1 may have added annotations to the content library 125-1. After uploading the content library 125-1 to the remote storage, other users 108 can access the content library 125-1, including the annotations.

In step 217, the article retrieving process 140-2 renders the content library 125-1 in the organization region 165. The content library 125-1 is rendered with an identifier indicating the content library 125-1 is stored remotely, accessible to a plurality of users 108 having access to the remote storage. In an example embodiment, the content library 125-1 is rendered in the organization region 165 with an icon that indicates the content library 125-1 has been uploaded to a remote server, and is accessible to users 108 who have access to that remote storage.

Alternatively, in step 218, the article retrieving process 140-2 receives notification that the content library 125-1 stored remotely has been updated. In an example embodiment, a first user 108 creates a content library 125-1, and uploads the content library 125-1 to a remote server. The content library 125-1 is displayed in the first user's 108 organization region 165 with an icon indicating the content library 125-1 has been uploaded to a remote server. A second user 108 views the content library 125-1, and adds annotations to the content library 125-1. The article retrieving process 140-2 receives notification that the content library 125-1 has been updated since the first user 108 initially uploaded the content library 125-1 to the remote server.

In step 219, the article retrieving process 140-2 renders the content library 125-1 in the organization region 165. The content library 125-1 is rendered with an identifier indicating the content library 125-1, stored remotely, has been updated at the remote storage. In an example configuration, the organization region 165 on the user's 108 displays the content library 125-1 with an icon indicating the content library 125-1 has been updated during the time period from when the user 108 either first created the content library 125-1, or downloaded the content library 125-1 from a remote server.

FIG. 11 is a flowchart of the steps performed by the article retrieving process 140-2 when it receives a selection to obtain the content 145-N represented by the content library 125-1.

In step 220, the article retrieving process 140-2 receives a selection to obtain the content 145-N represented by the content library 125-1. FIG. 5 displays an example screenshot of the options presented to a user 108 within the organization region 165. A content library 125-1 can consist of one or more folders 180-N. A user can perform various actions on a folder 180-1 within the organization region 165.

In step 221, the article retrieving process 140-2 receives a selection to view an annotation associated with at least one content folder 180-1 associated with a content library 125-1. An annotation provides an explanation associated with the content folder 180-1. A user 108 navigates to the organization region 165, and selects a content folder 180-1. A user 108 opens a folder options window and selects "Folder Annotations".

Alternatively, in step 222, the article retrieving process 140-2 receives a selection to edit the annotation associated with content folder 180-1. A user can display annotations associated with a content folder 180-1 and modify existing annotations. Any modifications made to a content folder 180-1 are identified with a timestamp of the modification and the name of the user 108 making the modifications.

FIG. 12 is a flowchart of the steps performed by the article retrieving process 140-2 when it renders content information 150-N that represents a listing of the content 145-N contained within the content library 125-1.

In step 223, the article retrieving process 140-2 renders content information 150-N that represents a listing of the content 145-N contained within the content library 125-1. The content information 150-N is displayed within a listing region 170 wherein the content 145-N may be accessible via the policy. The actual content 145-N may or may not be accessible to a user 108 depending on whether that user 108 has access to the content 145-N. The listing of the content information 150-N does not indicate access to the content source provider 155-1. The content library 125-1 can consist of content folders 180-N. Each content folder 180-1 can contain content 145-N in form of files (i.e., documents, articles, etc.).

In step 224, the article retrieving process 140-2 obtains a location associated with a file within the content folder 180-1 within the content library 125. The article retrieving process 140-2 identifies a location of the file, such as the content source provider 155-1 from which the files can be retrieved.

In step 225, the article retrieving process 140-2 associates the location of the file with the content information 155-1. The article retrieving process 140-2 creates content information 150-1 that links the location of the file with the content information 150-N, such as the title of the file, etc.

In step 226, the article retrieving process 140-2 displays the content information 150-N with a content identifier identifying a format associated with the file. The content information 150-N is displayed within the listing region 170. The content identifier, for example, indicates a type of file available, such as PDF format, or whether only an abstract of the file is available.

FIG. 13 is a continuation of a flowchart of the steps of FIG. 12 when the article retrieving process 140-2 displays the content information 150-N with a content identifier identifying a format associated with the file.

In step 226, the article retrieving process 140-2 displays the content information 150-N with a content identifier identifying a format associated with the file. FIG. 3 displays an example screen shot of the listing region 170, displaying content information 150-N. A user 108 can search within the content information 150-N.

In step 227, the article retrieving process 140-2 receives a notification to update the file associated with the content information 150-N within the listing region 170. The notification is to be automatically invoked at a predetermined time. FIG. 4 displays an example screen shot of the listing region 170, displaying options available within the listing region 170. A user 108 can set an alert that automatically updates the content information 150-N at a predetermined time. Thus, if the content information 150-N has been saved as a content library 125-1, the content library 125-1 will be updated at the time specified within the alert. Alerts are also displayed within the organization region 165 within the graphical user interface 160.

Alternatively, in step 228, the article retrieving process 140-2 receives a selection to perform an action on an annotation associated with the file. The annotation provides an explanation associated with the file within the listing region 170. The action can include at least one of:

i) viewing the annotation;
ii) editing the annotation; and
iii) deleting the annotation In an example embodiment, a user 108 performs a search in a search web page of a content source provider 155-1. From the results of that search, the user 108 selects the content 145-N (in the view region 175) from which to create a content library 125-1, and selects "Retrieve" from a tool bar in the view region 175. The article retrieving process 140-2 retrieves the content 145, and compiles content information 150-N in the listing region 170. The content information 150-N is a reference to the content 145-N, but not the actual content 145-N. A user 108 can select one or more content information 150-N from the listing region 170 and perform actions on those selections. FIG. 4 displays an example screenshot of the options available to a user 108 within the listing region 170.

Alternatively, in step 229, the article retrieving process 140-2 receives a request to perform a search on the content 145-N represented by the content information 150-N displayed within the listing region 170. FIG. 3 displays an example screen shot depicting a search window within the listing region 170. A user 108 can search within the results of the content information 150-N to further refine the search results, and compile a more relevant content library 125-1.

Alternatively, in step 230, the article retrieving process 140-2 receives a selection of the content information 150-N in the listing region 170. A toolbar in the listing region 170 allows a user 108 to select one or more content information 150-N to perform an action on the selected content information 150-N.

In step 231, the article retrieving process 140-2 displays the file associated with the content information 150-N. If the user 108 has been granted access to the file (i.e., the user has a paid subscription to the content source provider 155-1), the user 108 can select content information 150-N from the listing region 170 and display the file represented by the content information 150-N.

Figure 14:
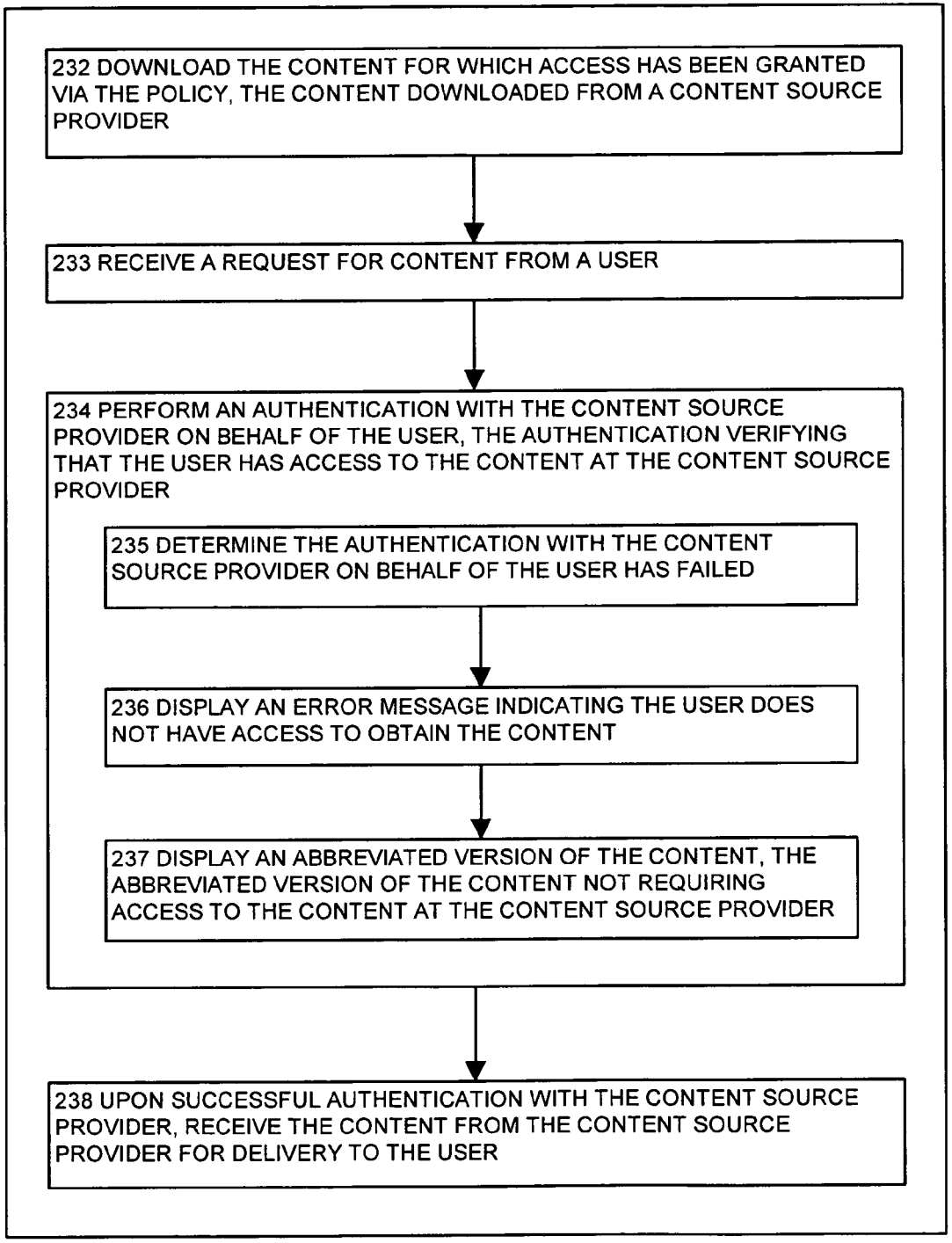
FIG. 14 illustrates a flowchart of a procedure performed by the system of FIG. 1 when the article retrieving process downloads the content for which access has been granted via the policy, the content downloaded from a content source provider, according to one embodiment disclosed herein.

FIG. 14 is a flowchart of the steps performed by the article retrieving process 140-2 when it downloads the content 145-N for which access has been granted via the policy.

In step 232, the article retrieving process 140-2 downloads the content 145-N for which access has been granted via the policy. The content is obtained from a content source provider 155-1. The user 108 can also select the content 145-N from the content information 150-N by selecting individual listings in the listing region 170. Once the content 145-N is obtained from the content source provider 155-1, the user 108 can view and or save the content 145-N.

In step 233, the article retrieving process 140-2 receives a request for content 145-N from a user 108. A user 108 can request in a variety of ways. The user 108 can also select the content 145-N from the content information 150-N by selecting individual listings in the listing region 170. The user 108 also obtain content 145-N via the organization region 165 by selecting a folder 180-1 and choosing a "Show Content in an External Browser" option.

In step 234, the article retrieving process 140-2 performs an authentication with the content source provider 155-1 on behalf of the user 108. The authentication verifies that the user 108 has access to the content 145-N at the content source provider 155-1. The article retrieving process 140-2 performs the steps of logging into the content source provider 155-1 on behalf of the user 108.

In step 235, the article retrieving process 140-2 determines the authentication with the content source provider 155-1 on behalf of the user 108 has failed. In one example embodiment, the article retrieving process 140-2 determines the user 108 does not have access to the content 145-N provided by the content source provider 155-1, and the authentication fails.

In step 236, the article retrieving process 140-2 displays an error message indicating the user 108 does not have access to obtain the content 145-N. Upon failure of the authentication process, the article retrieving process 140-2 displays an error message on the graphical user interface 160.

In step 237, the article retrieving process 140-2 displays an abbreviated version of the content 145-N. The abbreviated version of the content 145-N does not require access to the content 145-N at the content source provider 155-1. If the authentication process fails, the article retrieving process 140-2 displays abstracts, or abbreviated versions of the content 145-N. Typically no access is required to view abstracts from a content source provider 155-1.

Alternatively, upon successful authentication with the content source provider 155-1, in step 238, the article retrieving process 140-2 receives the content 145-N from the content source provider 155-1 for delivery to the user 108. If the authentication process with the content source provider 155-1 (on behalf of the user 108) is successful, the article retrieving process 140-2 displays the content 145-N to the user 108.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of maintaining content, the method comprising:
   rendering at least one content library in an organization region, the at least one content library representing content that is accessible via a policy, wherein rendering at least one content library in an organization region comprises:
      receiving a selection of the content source provider from which to create the at least one content library;
      receiving at least one search criterion with which to filter content on the content source provider;
      performing a search on the content source provider using the at least one search criterion;
      creating the at least one content library from a result of the search on the content source provider; and
      storing the at least one content library locally;
   receiving a selection to obtain the content represented by the at least one content library;
   rendering content information that represents a listing of the content contained within the at least one content library, the content information displayed within a listing region wherein the content may be accessible via the policy; and
   downloading the content for which access has been granted via the policy, the content downloaded from a content source provider.

2. The method of claim 1 wherein creating the at least one content library from a result of the search on the content source provider comprises:
   receiving a selection of a format in which to retrieve the content from the content source provider.

3. The method of claim 1 wherein creating the at least one content library from a result of the search on the content source provider comprises:
   receiving an indication of an amount of content to retrieve from the content source provider.

4. The method of claim 1 wherein storing the at least one content library locally comprises:
   rendering the at least one content library in the organization region, the at least one content library rendered with an identifier indicating the at least one content library is stored locally, accessible only to a user having access to a local storage.

5. The method of claim 1 comprising:
   uploading the at least one content library to a remote storage accessible to a plurality of users, the at least one content library comprising an abbreviated version of the content.

6. The method of claim 5 wherein uploading the at least one content library to a remote storage accessible to a plurality of users comprises:
   rendering the at least one content library in the organization region, the at least one content library rendered with an identifier indicating the at least one content library is stored remotely, accessible to a plurality of users having access to the remote storage.

7. The method of claim 5 wherein uploading the at least one content library to a remote storage accessible to a plurality of users comprises:
   receiving notification that the at least one content library stored remotely has been updated; and
   rendering the at least one content library in the organization region, the at least one content library rendered with an identifier indicating the at least one content library, stored remotely, has been updated at the remote storage.

8. The method of claim 1 wherein the at least one content library is comprised of at least one content folder and wherein receiving a selection to obtain the content represented by the at least one content library comprises:
   receiving a selection to view an annotation associated with the at least one content folder associated with the at least one content library, the annotation providing an explanation associated with the at least one content folder.

9. The method of claim 8 wherein receiving a selection to view an annotation associated with the at least one content folder comprises:
   receiving a selection to edit the annotation associated with the at least one content folder.

10. The method of claim 1 wherein the at least one content library is comprised of a at least one content folder, each content folder containing at least one file and wherein rendering content information that represents a listing of the content contained within the at least one content library comprises:
   obtaining a location associated with a file within the at least one content folder within the at least one content library;
   associating the location of the file with the content information; and
   displaying the content information with a content identifier identifying a format associated with the file.

11. The method of claim 10 wherein displaying the content information with a content identifier identifying a format associated with the file comprises:
   receiving a notification to update the file associated with the content information within the listing region, the notification to be automatically invoked at a predetermined time.

12. The method of claim 10 wherein displaying the content information with a content identifier identifying a format associated with the file comprises:
   receiving a selection to perform an action on an annotation associated with the file, the annotation providing an explanation associated with the file within the listing region, the action including at least one of:
      i) viewing the annotation;
      ii) editing the annotation; and
      iii) deleting the annotation.

13. The method of claim 10 wherein displaying the content information with a content identifier identifying a format associated with the file comprises:
   receiving a request to perform a search on the content represented by the content information displayed within the listing region.

14. The method of claim 10 wherein displaying the content information with a content identifier identifying a format associated with the file comprises:
   receiving a selection of the content information in the listing region; and
   displaying the file associated with the content information.

15. The method of claim 1 wherein downloading the content for which access has been granted via the policy, the content downloaded from a content source provider comprises:
- receiving a request for content from a user;
- performing an authentication with the content source provider on behalf of the user, the authentication verifying that the user has access to the content at the content source provider; and
- upon successful authentication with the content source provider, receiving the content from the content source provider for delivery to the user.

16. The method of claim 15 wherein performing an authentication with the content source provider on behalf of the user, the authentication verifying that the user has access to the content at the content source provider comprises:
- determining the authentication with the content source provider on behalf of the user has failed;
- displaying an error message indicating the user does not have access to obtain the content; and
- displaying an abbreviated version of the content, the abbreviated version of the content not requiring access to the content at the content source provider.

17. The method of claim 15 wherein receiving a request for content from a user comprises:
- receiving the request from the user from at least one of:
  - i) the organization region wherein the user invokes the request for content by selecting a folder in the organization region; and
  - ii) the listing region wherein the user invokes the request for content by selecting content information in the listing region.

18. A non-transitory computer readable medium encoded with computer programming logic that when executed on a process in a computerized device provides content maintenance, the medium comprising:
- instructions for rendering at least one content library in an organization region, the at least one content library representing content that is accessible via a policy, wherein instructions for rendering at least one content library in an organization region comprises:
  - instructions for receiving a selection of the content source provider from which to create the at least one content library;
  - instructions for receiving at least one search criterion with which to filter content on the content source provider;
  - instructions for performing a search on the content source provider using the at least one search criterion;
  - instructions for creating the at least one content library from a result of the search on the content source provider; and
  - instructions for storing the at least one content library locally;
- instructions for receiving a selection to obtain the content represented by the at least one content library;
- instructions for rendering content information that represents a listing of the content contained within the at least one content library, the content information displayed within a listing region wherein the content may be accessible via the policy; and
- instructions for downloading the content for which access has been granted via the policy, the content downloaded from a content source provider.

19. The computer readable medium of claim 18 wherein said instructions for obtaining the content for which access has been granted via the policy, the content obtained from a content source provider further comprises:
- instructions for receiving a request for content from a user;
- instructions for performing an authentication with the content source provider on behalf of the user, the authentication verifying that the user has access to the content at the content source provider; and
- upon successful authentication with the content source provider, instructions for receiving the content from the content source provider for delivery to the user.

* * * * *